United States Patent Office 3,703,439
Patented Nov. 21, 1972

3,703,439
PROCESS FOR THE PREPARATION OF L-BETA-(3,4-DIHYDROXYPHENYL)-ALPHA-ALANINE BY FERMENTATION

Jean Florent, Jean Lunel, and Jacques Renaut, Paris, France, assignors to Rhone-Poulenc S.A., Paris, France
No Drawing. Filed Jan. 20, 1971, Ser. No. 108,185
Claims priority, application France, Jan. 21, 1970, 2,129
Int. Cl. C12d 3/00
U.S. Cl. 195—29  14 Claims

ABSTRACT OF THE DISCLOSURE

L-$\beta$-(3,4-dihydroxyphenyl)-$\alpha$-alanine is prepared by the microbiological hydroxylation of L-tyrosine using *Vibrio tyrosinaticus* ATCC 19,378 as microorganism for the conversion.

---

This invention relates to a process for the preparation of L - $\beta$ - (3,4-dihydroxyphenyl)-$\alpha$-alanine (hereinafter referred to as "L-DOPA") by microbiological transformation of tyrosine.

It is well known that L-DOPA is a product of the metabolism of L-tyrosine in man and in animals. There also exist, in higher fungi and in plants, "tyrosinases" which convert L-tyrosine into melanine pigments via L-DOPA.

Microorganisms generally utilise tyrosine entirely differently. However, Larway and Evans (Biochem. 85, 22P, 1962) have analysed the black pigment which is formed in cultures of *Microspira tyrosinatica* which has developed in the presence of tyrosine, and have shown that this pigment contains L-DOPA. It has subsequently been shown (Aronson and Vickers, Biochim. Biophys. Acta 110, 624, 1965) that the water-soluble extracts of *Bacillus cereus* T contain a tyrosinase which is capable of converting tyrosine and metatyrosine into L-DOPA. Finally Sih et al. (J. Am. Chem. So. 91, 6204, 1969) have described a preparation of L-DOPA by oxidation of L-tyrosine (after blocking the amine group by various groups) with various microorganisms, including *Gliocladium deliquescens*.

It has now been found, and it is this which forms the subject of the present invention, that *Vibrio tyrosinaticus* ATTC 19,378 in a submerged culture is capable of converting large quantities of L-tyrosine to L-DOPA in high yield. Economical production of this substance can thus be achieved.

The present invention accordingly provides a process for the preparation of L-DOPA which comprises aerobically cultivating *Vibrio tyrosinaticus* ATCC 19,378, or an L-DOPA-producing mutant thereof, in an aerated aqueous nutrient medium containing assimilable sources of carbon, nitrogen and inorganic substances, at a temperature of from 22° to 37° C. in the presence of tyrosine, and separating the L-DOPA thus formed.

In carrying out the process it is not necessary to isolate the microorganisms to extract the enzymatic systems from them, this being generally difficult to carry out on a large scale.

The transformation of L-tyrosine into L-DOPA by *Vibrio tyrosinaticus* ATCC 19,378 takes place at various pH's. The highest transformation yields are usually obtained at pH values of 4.0 to 7.0, and preferably between 5 and 6.

As the optimum pH for the transformation is not compatible with good development of the microorganism, it is preferable for the culture to comprise two stages; in the first stage, *Vibrio tyrosinaticus* ATCC 19,378 is allowed to develop in an appropriate nutrient medium at a pH above 6.0; in the second stage, the tyrosine is added to the medium and the pH of the medium is adjusted, if necessary, so as to bring it into the most favourable range for the conversion of tyrosine to L-DOPA.

The culture of *Vibrio tyrosinaticus* ATCC 19,378 can be carried out by any of the known aerobic surface culture or submerged culture methods, the latter being preferred because they are more convenient. Conventional types of apparatus currently used in the fermentation industry may be employed. In particular, the following sequence of operations may be adopted:

*Vibrio tyrosinaticus* ATCC 19,378

↓ culture on agar

↓ culture in an agitated flask

↓ production culture in a fermenter

The fermentation medium must contain an assimilable source of carbon, an assimilable source of nitrogen and inorganic substances, and optional growth-promoting factors; all these elements may be supplied as well-defined products or complex mixtures such as those found in biological products of various origins.

As sources of assimilable carbon there may be used carbohydrates such as glucose, maltose, dextrins, starch or sugar alcohols, e.g. glycerol, or other carbon-hydrogen- and oxygen-containing substances such as molasses. Certain animal or vegetable oils such as lard oil or soyabean oil may be advantageously used instead of, or in admixture with, carbon-, hydrogen- and oxygen-containing substances.

The suitable sources of assimilable nitrogen are extremely varied. They may be vary simple chemical compounds such as inorganic or organic ammonium salts, urea or certain amino acids. They may also be complex substances containing principally nitrogen in a protein form, e.g. casein, lactalbumin, gluten and their hydrolysates, soyabean flour, peanut meal, fishmeal, meat extract, yeast extract, distillers' solubles or corn-steep liquor.

Amongst the inorganic substances, some may have a buffering or neutralising effect such as the alkali metal or alkaline earth metal phosphates, or the carbonates of calcium and magnesium. Others contribute to the ionic equilibrium needed for the development of *Vibrio tyrosinaticus* ATCC 19,378, such as the chlorides and sulphates of the alkali metals and alkaline earth metals. Finally, some of them act more especially as activators of metabolic reactions of *Vibrio tyrosinaticus*; to these belong the salt of zinc, cobalt, iron, copper and manganese.

The pH of the fermentation medium at the start of the culture should be between 6.0 and 7.8 and preferably between 6.5 and 7.5. The culture medium thus prepared is inoculated with an inoculum culture, in a liquid medium, of the strain *Vibrio tyrosinaticus* ATCC 19,378 and the culture is incubated at between 22° and 37° C. and preferably at 25–31° C. with stirring and aeration. The rate of aeration of the fermentation broth can vary within quite wide limits, but it has been found that an aeration rate of 0.3 to 3 litres of air per litre of broth per minute is particularly suitable.

In the second stage, during which the synthesis of the L–DOPA takes place, technical grade L-tyrosine is added to the fermentation broth in amounts of from 0.1 to 15 g./l. and preferably between 3 and 10 g./l. The L-tyrosine can be added in solid form or in the form of a solution and at various times during the culture, but is preferably added after a first stage (incubation) of 16 to 24 hours. The use of acids or bases to dissolve the tyrosine allows relatively concentrated solutions of the latter to be obtained. It is advantageous to effect the addition using simultaneously a solution of tyrosine in hydrochloric acid and a solution of tyrosine in sodium hydroxide solution, because addition of the two solutions in suitable ratio makes it possible simultaneously to introduce the desired quantity of tyrosine into the fermentation medium and to adjust its pH without significantly increasing the amount of inorganic salts in the medium. After the addition of the tyrosine, regardless of the time and of the amount added, it is advisable to continue the culture for a further 1 to 2 days under the same conditions of stirring and of temperature as hereinbefore mentioned, so as to achieve the maximum production of L-DOPA.

It can be advantageous to add glucose (2 to 20 g./l.) to the culture medium at the start of the transformation stage, i.e. immediately after the addition of tyrosine, the metabolism of the glucose simultaneously providing a source of energy for the microorganism and a means of controlling the pH of the fermentation broth so as to avoid it going above 6.0, which is unfavourable both for the transformation of the tyrosine and the stability of the L-DOPA already formed.

The transformation of the L-tyrosine into L-DOPA may advantageously be carried out in the presence of ascorbic acid. The ascorbic acid is generally added after the stage of development of the microorganism, either before or during or after the addition of L-tyrosine, and allows good yields of L-DOPA to be obtained even if, during the transformation stage, the pH is between 6 and 7. Under these conditions, it is generally no longer necessary to adjust the pH of the fermentation broth before the start of the transformation of the L-tyrosine into L-DOPA. The ascorbic acid, added all at once or in portions, is generally used at concentrations between 1 and 5 g./litre.

The transformation of the L-tyrosine into L-DOPA is favourably influenced by the presence in the fermentation broth of copper salts at quantities of 1 to 10 mg./litre, and antioxidants (e.g. sorbic acid, N,N′-diphenyl-para-phenylenediamine, 2-(and 3-)t.-butyl-4-methoxyphenols, 2,6-di-t.-butyl-para-cresol and, more especially 2,2,4-trimethyl-6-ethoxy-1,2-dihydro-quinoline, at quantities of 0.1 to 1 g./litre.

The extraction of the L-DOPA from the fermentation broth can be carried out in a known manner. For example, the broth is clarified after acidification to pH 2 by filtering of centrifuging. The L-DOPA is then retained on a cation exchange resin of the sulphonate type in accordance with the technique described by L. E. Martin and C. Harisson (Anal. Biochem. 23,529, 1968) and subsequently on alumina in the presence of ethylenediaminetetraacetic acid and sodium metabisulphite, in accordance with the method of A. H. Anton and D. E. Sayre (J. Pharmacol. Exp. Therap., 145, 326, 1964). The L-DOPA retained by the alumina can be eluted with a solution of oxalic acid and purified by recrystallisation after separation of the oxalic acid.

The following non-limitative examples illustrate the invention.

EXAMPLE 1

A 30-litre fermenter is charged with

| | G. |
|---|---|
| Yeast extract | 40 |
| Peptone | 80 |
| Meat extract | 80 |
| Glucose monohydrate | 160 |
| Sodium chloride | 80 |

Tap water, sufficient to make up to 17 litres.

The pH is adjusted to 7.5 by adding 10 N sodium hydroxide solution (22 cc.). The medium is sterilised by heating at 122° C. for 40 minutes. After cooling, the volume of the broth is 16 litres and the pH is 6.95. It is then inoculated with a culture of *Vibrio tyrosinaticus* ATCC 19,378 (200 cc.) in an agitated Erlenmeyer flask. The culture is developed at 26° C. for 16 hours, with agitation and aeration with sterile air; it is then suitable for effecting the desired transformation of tyrosine. This is effected at pH 5.3.

The pH of the culture is adjusted to 5.3 with a sterile 2.4 N hydrochloric acid solution, and tyrosine (64 g.) is added in two sterile aqueous solutions of equal volume, one of 20% in 2.4 N hydrochloric acid and the other of 20% in 2.4 N sodium hydroxide. A sterile solution (350 cc.) containing glucose monohydrate (160 g.) is added, and the production culture is then carried out for 27 hours, the pH being corrected, if necessary, so as to maintain it at 5.3. The final volume is 14 litres containing 3.0 g./l. of L-DOPA.

The amount of L-DOPA is determined on the filtrate at pH 2 obtained from the fermentation broth in accordance with the method described by L. E. Arnow [J. Biol. Chem. 118, 531, 1937]. The colouration obtained is recorded by means of a spectrophotometer relative to a pure sample of L-DOPA. The validity of this determination (which is not specific for L-DOPA) is confirmed by chromatography of the filtrate on a thin layer of cellulose using the solvent systems propanol-water (7:3 by volume) or isopropanol-0.1 N HCl (5:1 by volume) and spectrophotometric evaluation of the L-DOPA after development with potassium ferricyanide and ethylenediamine. The concentration determined by these two methods are in good agreement.

EXAMPLE 2

A fraction (1.8 litres) of the transformation culture obtained as described in Example 1, containing L-DOPA (5.4 g.), is acidified to pH 2 with 12 N hydrochloric acid (50 cc.) and centrifuged. The supernatant liquid collected is passed without further treatment over a column (diameter 7.5 cm.—height 63 cm.) of Dowex 50 W-X 2 resin in the acid form (resin based on polystyrenesulphonic acid with 2% of divinylbenzene, containing 0.9 milliequivalent/ml. and 5.3 milliequivalent/g. relative to dry resin). The L-DOPA retained is eluted with 2 N hydrochloric acid. The eluate (5.2 litres), which still contains small amounts of unconverted tyrosine, is purified by adjusting its pH to 4.0 with sodium hydroxide solution ($d=1.33$, 800 cc.), adding alumina (250 g.), sodium metabisulphite (5 g.) and the disodium salt of ethylenediaminetetraacetic acid (5 g.). The mixture is stirred, its pH adjusted to 8.6 by addition of concentrated sodium hydroxide solution ($d=1.33$, 200 cc.), and the whole left to stand for 15 minutes. The alumina is filtered off and washed repeatedly with distilled water (total 3 litres). The filtrate and the washings which contain tyrosine are discarded, and the L-DOPA is recovered by treating the alumina with 2 N oxalic acid (2.2 litres). The oxalic acid solution is concentrated to 0.7 litre under reduced pressure (30 mm. Hg) by heating on a boiling water-bath, and the oxalic acid which has crystallised is filtered off. The filtrate is thereafter treated with ethanol (3.7 litres) and its pH adjusted to 5.5 with sodium hydroxide solution ($d$=1.33, 150 cc.) to precipitate the inorganic salts. The precipitation is completed by the further addition of acetone (3.7 litres). The precipitate formed is filtered off immediately and the new filtrate is concentrated to 0.8 litres under reduced presure (30 m. Hg) by heating on a boiling waterbath. The concentration is completed at normal pressure under a nitrogen atmosphere by heating with a paraffin bath, yielding a solution (70 cc.) from which crude L-DOPA (2.54 g.) is isolated after standing for 10 hours at 4° C. Concentration of the crystallisation mother liquors yields further crystals (0.65 g.).

The crude products are combined and purified by recrystallisation from water, after decolourising the aqueous solution with activated charcoal. Crystalline L-DOPA (2.65 g.) is obtained in 49% yield relative to the product determined in the fermentation broth.

$$[\alpha]_D^{20} = -16.4 \pm 0.8 \ (c.=1, 0.1 \ N \ HCl)$$

When the product is chromatographed on a thin layer of cellulose using the system propanol-3 N HCl, 70–30 (by volume), and developed with $\alpha$-nitroso-$\beta$-naphthol [cf. R. Acher and C. Crocker, Biochem. Biophys. Acta, 9, 704 (1952)], it is shown to be free of tyrosine.

EXAMPLE 3

A 75-litre fermenter is charged with

| | G. |
|---|---|
| Yeast extract | 100 |
| Peptone | 200 |
| Meat extract | 200 |
| Sodium chloride | 200 |

Tap water, sufficient to make up to 33 litres.

The pH is adjusted to 7 by addition of 10 N sodium hydroxide solution (40 cc.). The medium is sterilised by bubbling steam at 122° C. through it for 40 minutes. After cooling, the volume of the broth is 38.5 litres. It is made up to 40 litres by adding a sterile aqueous solution (1.5 litres) containing glucose monohydrate (600 g.). The pH of the resulting medium is 6.90. It is then inoculated with a culture (200 cc.) of *Vibrio tyrosinaticus* ATCC 19,378 in an agitated Erlenmeyer flask. The culture is developed at 30° C. for 10 hours with agitation and aeration with sterile air; it is then suitable for inoculation of the production culture.

The production culture is carried out in a 800-litre fermenter charged with the following substances:

| | Kg. |
|---|---|
| Corn-steep (50% solids content) | 2.2 |
| Magnesium sulphate (MgSO$_4$·7H$_2$O) | 0.220 |

Tap water, sufficient to make up to 390 litres.

The pH is adjusted to 6.6 with 10 N sodium hydroxide solution (120 cc.), calcium carbonate (1.1 kg.) is added, and the medium is then sterilised by bubbling steam at 122° C. through it for 40 minutes. After cooling, the volume of the broth is 425 litres. It is made up to 440 litres by adding a sterile aqueous solution (10 litres) containing glucose monohydrate (4.4 kg.) and a sterile aqueous solution (5 litres) containing ammonium sulphate (0.880 kg.). The pH of the broth is 7.

Inoculation is then effected with the inoculum culture (6 litres) from the 75-litre fermenter described above. The production culture is developed at 30° C. for 20 hours, with agitation using a motor rotating at 180 revolutions per minute and aeration with sterile air at the rate of 20 m.$^3$/hour. The pH of the medium is maintained at 6.6±0.05 by adding 6 N ammonia or 4 N hydrochloric acid.

After 20 hours, the medium is suitable for carrying out the desired transformation of tyrosine; its volume is adjusted to 400 litres, and its pH adjusted to 5.5 with 6 N hydrochloric acid.

An aqueous solution (1.1 litres) at pH 5.5 is then introduced containing L-ascorbic acid (215 g.), and the fermentation broth is agitated for 2 hours at 30° C. using a motor rotating at 180 revolutions per minute, and is aerated with sterile air at the rate of 20 m.$^3$/hour.

A further aqueous solution (1.1 litres) at pH 5.5, containing L-ascorbic acid (215 g.) is introduced into the broth, followed by L-tyrosine (1.720 kg.) in two sterile aqueous solutions of equal volume, one of 6.15% in N sodium hydroxide and the other of 6.15% in N hydrochloric acid. Three further quantities of an aqueous solution (1.1 litres) at pH 5.5, containing L-ascorbic acid (215 g.) are added at 1 hour intervals. The culture is continued for 7 hours after the end of these additions, the pH being maintained at 5.5. The final volume of the broth is 430 litres. The amount of L-DOPA present is then 3.55 g./litre.

EXAMPLE 4

A culture of *Vibrio tyrosinaticus* ATCC 19,378 is prepared under the conditions of Example 3. After 20 hours, the culture is suitable for carrying out the transformation, the volume of the fermentation broth is adjusted to 400 litres and the pH is maintained at 6.6.

An aqueous solution (2.2 litres, pH=6.5) is then introduced, containing L-ascorbic acid (400 g.), and the broth is agitated for 2 hours at 30° C. using a motor rotating at 180 revolutions per minute, and is aerated with sterile air at the rate of 20 m.$^3$/hour.

An aqueous solution (2.2 litres) at pH 6.5, containing L-ascorbic acid (400 g.) is further added to the broth, followed by L-tyrosine (1.720 kg.) in two sterile aqueous solutions of equal volume, one of 6.15% in N sodium hydroxide and the other of 6.15% in N hydrochloric acid.

Thereafter the following additions are made successively at 1 hour intervals:

two additions of an aqueous solution (1.1 litres) at pH 6.5 containing L-ascorbic acid (200 g.), and one addition of an aqueous solution (2.2 litres) containing L-ascorbic acid (400 g.).

The culture is continued for 7 hours after the last addition, the pH of the broth being maintained at 6.6.

The final volume of the broth is 430 litres. The amount of L-DOPA present is 2.79 g./litre.

We claim:

1. Process for the preparation of L-DOPA which comprises cultivating *Vibrio tyrosinaticus* ATCC 19,378, or an L-DOPA-producing mutant thereof, in an aerated aqueous nutrient medium containing assimilable sources of carbon, nitrogen and inorganic substances at a temperature of from 22° to 37° C. in the presence of L-tyrosine, and separating the L-DOPA so formed from the culture medium.

2. Process according to claim 1 in which the culture of *Vibrio tyrosinaticus* is carried out in two stages, the first a growth stage in which the pH of the medium is from 6.0 to 7.8, and the second a transformation stage during which the L-tyrosine is converted to L-DOPA with the medium at a pH of from 4.0 to 7.0.

3. Process according to claim 2 in which the growth stage is carried out at a pH of 6.5 to 7.5 and the transformation stage is carried out at a pH of between 5 and 6.

4. Process according to claim 3 in which the temperature of the culture medium is 25–31° C.

5. Process according to claim 1 in which the amount of tyrosine present in the culture medium is from 0.1 to 15 grams per litre.

6. Process according to claim 5 in which the tyrosine is present in an amount between 3 and 10 grams per litre.

7. Process according to claim 2 in which the tyrosine is added to the culture medium in the form of two solutions, one being acid and the other basic.

8. Process according to claim 2 in which glucose is added to the culture medium during the stage of transformation of the tyrosine.

9. Process according to claim 8 in which the amount of glucose added is 2 to 20 grams per litre.

10. Process according to claim 2 in which the transformation of tyrosine is carried out in the presence of ascorbic acid.

11. Process according to claim 10 in which the ascorbic acid is added to the culture medium after the growth stage of the microorganism, either before, during or after the addition of the tyrosine.

12. Process according to claim 11 in which the amount of ascorbic acid added to the culture medium is 1 to 5 grams per litre.

13. Process according to claim 2 in which the transformation of tyrosine is carried out in the presence of at least one copper salt in an amount of 1 to 10 mg. per litre of culture medium.

14. Process according to claim 2 in which the transformation of tyrosine is carried out in the presence of an antioxidant in an amount of 0.1 to 1 gram per litre of culture medium.

References Cited

Journal of the American Chemical Society, vol. 91, p. 6204 (1969).

ALVIN E. TANENHOLTZ, Primary Examiner

U.S. Cl. X.R.

195—51 R